United States Patent
Joyner

(10) Patent No.: US 6,375,887 B1
(45) Date of Patent: Apr. 23, 2002

(54) METHOD AND APPARATUS FOR CREATING CAST PARTS AND INVESTMENT MODELS

(76) Inventor: Victor Joyner, 15927 Parkside Ave., South Holland, IL (US) 60473

( * ) Notice: Subject to any disclaimer, the term of this patent is extended or adjusted under 35 U.S.C. 154(b) by 0 days.

(21) Appl. No.: 09/551,845

(22) Filed: Apr. 18, 2000

(51) Int. Cl.[7] .......................... B29C 33/40; B29C 35/08
(52) U.S. Cl. ..................................... 264/496; 425/174.4
(58) Field of Search ..................... 264/496; 425/174.4

(56) References Cited

U.S. PATENT DOCUMENTS

| | | |
|---|---|---|
| 4,042,654 A | 8/1977 | Leszyk et al. |
| 4,265,723 A | 5/1981 | Hesse et al. |
| 4,575,330 A | 3/1986 | Hull |
| 4,844,144 A | 7/1989 | Murphy et al. |
| 4,985,472 A | 1/1991 | Aosai et al. |
| 5,263,533 A | 11/1993 | Druschitz et al. |
| 5,338,769 A | 8/1994 | Miyamoto |
| 5,735,336 A | 4/1998 | Oti |
| 5,763,503 A | 6/1998 | Cowperthwaite |
| 5,916,509 A * | 6/1999 | Durhman ................. 264/496 X |
| 5,981,616 A | 11/1999 | Yamamura et al. |
| 5,990,190 A | 11/1999 | Nakamura et al. |
| 6,025,114 A | 2/2000 | Popat et al. |
| 6,171,093 B1 * | 1/2001 | Hawkinson .............. 425/174.4 |

* cited by examiner

Primary Examiner—Leo B. Tentoni
(74) Attorney, Agent, or Firm—Harold Gell

(57) ABSTRACT

A process and apparatus for casting three-dimensional parts and investment models from a class of fluid casting compounds, which are solidified by a reaction triggered by actinic radiation. The casting compound hardens in a chain reaction induced by the radiation and/or the casting compound acts as a conduit for the radiation during and after curing. This allows parts being cast to be solidified within molds that are opaque. The apparatus consists of a solidifying actinic radiation source positioned to trigger the chain reaction as the casting compound enters the mold and/or radiate into the mold cavity through the sprue hole, windows or venting holes to effect the curing process. The curing, or solidifying, process is accelerated by irradiating the compound as it flows into the mold cavity.

19 Claims, 3 Drawing Sheets

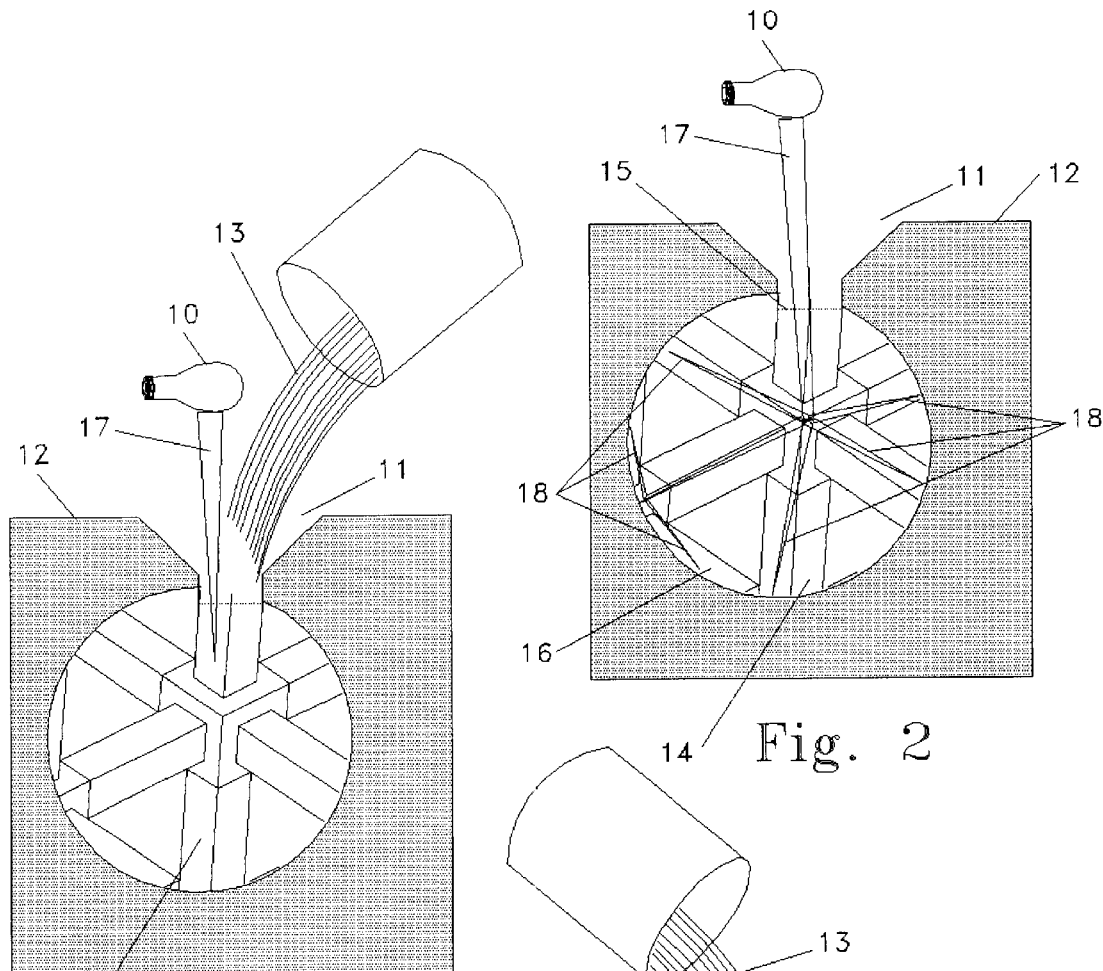
Fig. 1
Fig. 2
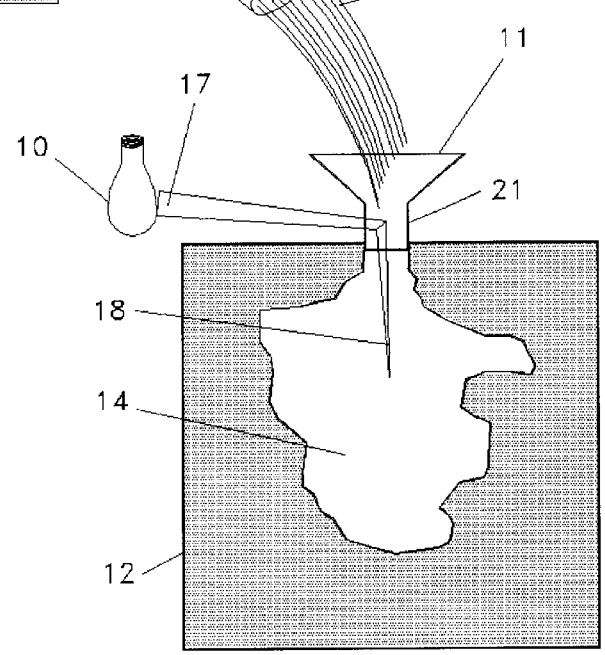
Fig. 3

METHOD AND APPARATUS FOR CREATING CAST PARTS AND INVESTMENT MODELS

FIELD OF THE INVENTION

This invention relates to a method and apparatus for casting parts and investment models from fluid compositions which solidify when exposed to actinic radiation. The compounds are solidified within a mold by irradiating the photocurable compounds as they enter the mold or through openings in the body of the mold. The invention is effected by using compounds from the class of photo-hardened fluids including those which 1) conduct the actinic radiation they are responsive to whereby the radiation travels throughout the body of the part being cast and/or 2) undergo a hardening chain reaction which is triggered by exposure to actinic radiation.

BACKGROUND OF THE INVENTION

Photocurable resins have been used to produce three-dimensional parts and patterns for investment casting. The techniques predominantly used are stereolithography wherein a part or model is created by the slow accretion of layers cured by computer controled laser beams and by direct casting using relatively thin walled molds which are transparent to the actinic radiation.

DISCUSSION OF THE RELATED ART

One example of using stereolithography to produce three-dimensional patterns for investment casting is U.S. Pat. No. 4,844,144 issued to E. Murphy et al., on Jul. $4^{th}$, 1989. This system utilizes a light curable ethylenically unsaturated liquid material mixed with an inert thermoplastic material which is cured layer by layer as taught by Hull in U.S. Pat. No. 4,575,330.

The high cost and technical complexities inherent in the Hull process are eliminated by using a direct casting technique such as taught by S. Nakamura, et al. in U.S. Pat. No. 5,990,190. In this system, an actinic radiation transparent mold is surrounded by sources of curing radiation which penetrate the mold from six directions. The need to completely surround the mold with radiation greatly increases the complexity and cost of the process. Furthermore, the need to create the master mold from a radiation transparent material imposes severe limitations on the structural integrity of the mold and limits the geometry of the end product, i.e. the casting.

OBJECTIVES OF THE INVENTION

A primary objective of the present invention is to provide a method and apparatus for casting a part or a sacrificial model for investment casting from an actinic radiation curable material which is cast and cured in a mold that does not have to be transparent.

Another objective is to provide a method for casting a radiation curable material incorporating a photoinitiator wherein the material is cured in the mold by a single source of radiation.

A still further objective of the invention is to provide a method for casting an actinic radiation curable material by irradiating the material as it is being pored or injected into the mold.

Another objective of the invention is to photocure material within a mold by irradiating the material through the sprue hole.

A further objective is to cure material within a mold by transmitting curing radiation through one or more openings in the mold, such as vents, whereby curing radiation is transmitted through the total volume of mold cavity via the radiation transparency of the casting media.

Other objects, features and advantages of this invention will be apparent from the drawings, specification and claims which follow.

SUMMARY OF THE INVENTION

The present invention teaches a process and apparatus for casting three-dimensional parts and sacrificial models from a class of casting compounds which are solidified by actinic radiation. The class of casting compounds include, 1) compounds which act as conduits for the actinic radiation during and/or after hardening and 2) compounds which are hardened by an actinic radiation induced chain reaction throughout the body of fluid casting compound. These compounds allow the part being cast to be cured within molds that are opaque. The apparatus consists of an actinic radiation source positioned to irradiate the casting compound, which incorporates it photoinitiator, as it enters the mold and/or radiate into the mold cavity through the sprue hole, windows and/or venting holes to effect the solidifying process.

BRIEF DESCRIPTION OF THE DRAWINGS

FIG. 1 is a simplified schematic representation of a basic form of the invention depicting the application of reaction curing radiation through a mold sprue hole.

FIG. 2 is a view of the simplified schematic representation of a basic form of the invention depicted in FIG. 1, illustrating the disbursement of curing radiation throughout the mold cavity via the part being cast.

FIG. 3 is a simplified schematic representation of the invention depicting the application of curing radiation through a transparent section of an extended sprue conduit.

Throughout the foregoing illustrations, like reference designators indicate like parts.

DESCRIPTION OF THE PREFERRED EMBODIMENTS

Figures 4, 5, 6:
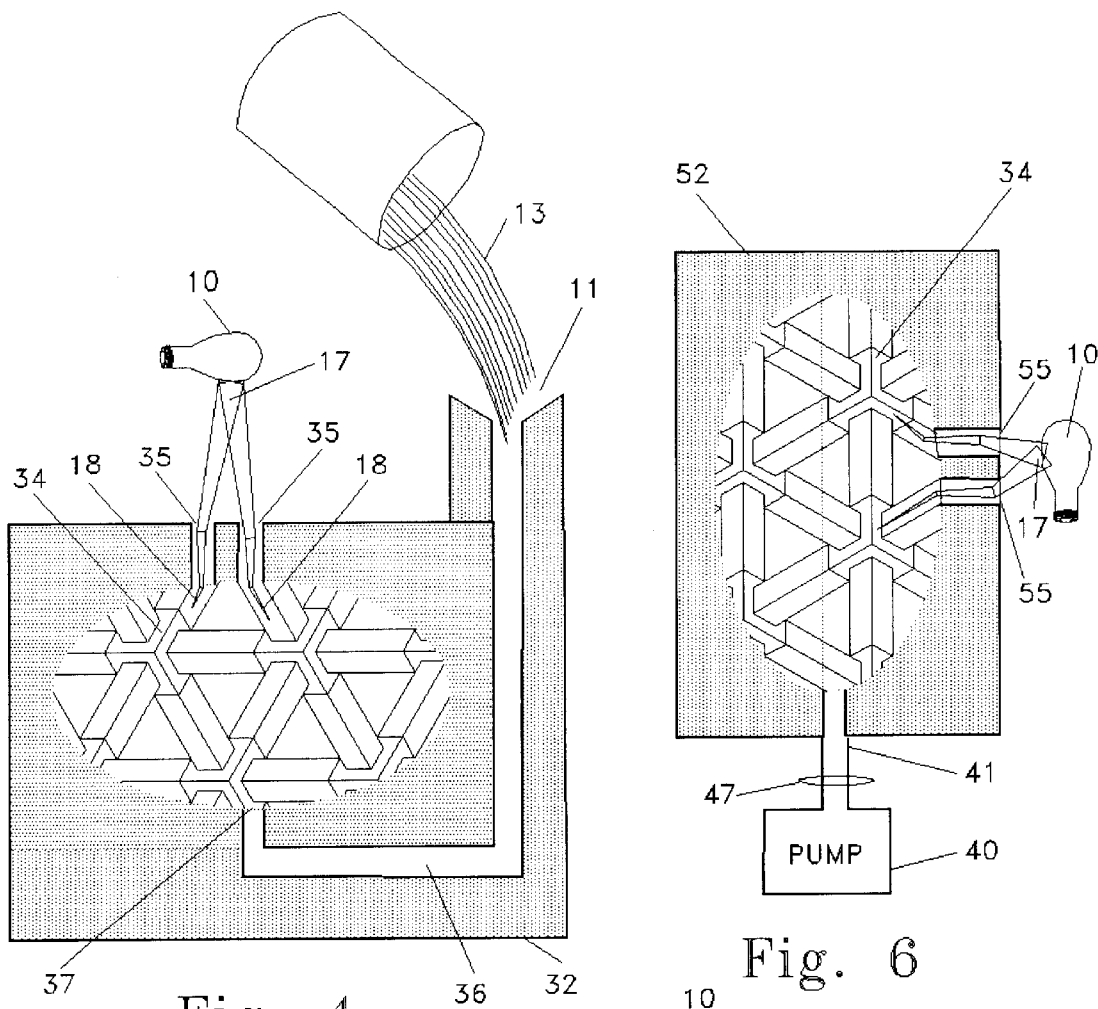
FIG. 4 is a simplified schematic representation of the invention depicting the application of curing radiation through mold vents.
FIG. 5 is a simplified schematic representation of the invention depicting the application of curing radiation through mold vents and the injection of actinic radiation responsive casting media via a pump means.
FIG. 6 is a simplified schematic representation of the invention depicting the application of curing radiation through actinic radiation transparent windows.

Throughout the following description and claims, the terms "cure", "cured", "curing", "solidified", "solidifying", "hardening" and "hardened" are used interchangeably to describe a transition of material from liquid to solid. The term "radiation" is used to identify the radiation which initiates the transition of material from a liquid to a solid state. The frequency of radiation is dependent on the photoinitiator used in the casting compound. In the preferred embodiment, the radiation is light in the ultraviolet range which performs as actinic radiation causing a liquid to solid phase change in the casting medium.

The various embodiments of the invention are perfected through the use of a flowable casting medium, 13, which may be poured or injected into a mold cavity and is hardened by radiation. The casting medium is selected from a class of flowable compounds which include a photoinitiator and become solidified, 1) when exposed to radiation and are transparent to the solidifying radiation whereby the casting functions as a radiation guide or light pipe during the curing process and/or 2) as a function of a chain reaction initiated by radiation. Actinic radiation is the preferred radiation for causing the transition of the casting medium from liquid to solid. Examples of typical photoinitiators which may be used in the casting medium compound may be found in U.S. Pat. No. 6,025,114 issued to A. Popat et al. on Feb. 15$^{th}$, 2000 for "Liquid Photocurable Compositions". The transparent or chain reaction qualities of the casting medium enable its use in self-venting molds fabricated from generally opaque materials such as porous plaster and sand. Examples of such self-venting molds are presented FIGS. 1, 2, 3 and 6.

FIG. 1 illustrates the basic embodiment of the invention in which a radiation source 10 is positioned to radiate 17 into the sprue opening 11 of a mold 12. The mold may be fabricated from whatever materials the designers deem appropriate for the object being cast.

The radiation curable compound 13 is poured into the sprue opening 11 and flows into the mold cavity 14. In a first embodiment, the radiation source is turned on after the pour has been completed. The compound begins to cure at the top 15 of the mold cavity and the radiation or chain reaction is dispersed 18 throughout the cured and curing compound. In the embodiments using the radiation conductive casting compound, the casting functions as a light pipe, reaching every space within the mold cavity into which compound has flowed, as illustrated in FIG. 2. In the embodiments which use compounds hardened by a chain reaction, radiation may be terminated once the chain reaction is initiated. However, if the chain reaction compound is transparent to the radiation, the hardening process is enhanced by continuing to apply the radiation to the casting. Once the compound is cured, the mold is opened and the cast object, which may be any three-dimensional element, is removed.

In an alternate embodiment, the radiation source is turned on at the beginning of the pour and continues throughout pour and until the cast article is cured or a chain reaction has been initiated.

The embodiment illustrated by FIG. 3 is similar to the embodiments depicted by FIG. 1. The sprue opening in this embodiment includes an extension 21 which is transparent to radiation or includes at least a section that is transparent to the radiation. This allows the radiation source 10 to be placed conveniently to the side of the mold cavity so the source of radiation will not interfere with the pour. This greatly facilitates applying curing radiation to the compound during the pour. In this embodiment, the radiation 17 enters the sidewall of the extension 21 and is conducted 18 into the mold cavity 14 by the compound 13 in embodiments using the radiation conducting forms of casting compound. When the hardening process includes a radiation induced chain reaction, the chain reaction progresses 18 into the mold cavity as the irradiated casting compound fills the mold.

FIG. 4 illustrates a gravity fed mold 32. The mold cavity 34 is provided with one or more vent openings 35 which allow air to escape through the mold cavity 34 as the casting compound 13 is poured into the sprue opening 11. In the gravity fed embodiment, casting compound flows through channel 36 which couples the sprue opening with the lowest portion 37 of the mold cavity so that the mold will fill from the bottom to the top. Once the mold cavity has been filled, the radiation source is 10 is turned on to cure the part being cast. In an alternate embodiment, the radiation source may be on at the beginning of the pour and continue until the part is cured or a chain reaction initiated. As in all embodiments, the radiation 17 and/or chain reaction progresses throughout the mold cavity as the casting cures.

For various design considerations, where mold venting is required and a gravity feed systems such as illustrated in FIG. 4 is not practical, an embodiment such as depicted by FIG. 5 may be used. In this embodiment, a pump 40 is used to inject the compound into the mold 42 through conduit 41. In this version of the invention, curing radiation from the source 10 enters the mold cavity via openings 35 and solidifying occurs in a fashion similar to that experienced in the apparatus illustrated by FIG. 4. The radiation travels from the source 10 through openings 35 to cure the compound. The radiation 17 or chain reaction travels 18 through the cured and curing compound to the various extremities within the mold cavity 34 until all elements of the part being cast have been hardened. This embodiment requires a gate 47 which is a radiation impervious means to seal the pump outlet at the end of the injection to prevent radiation or the chain reaction from traveling into the body of the pump. In an alternative form of this embodiment of the invention, conduit 41 is transparent to the curing radiation and the radiation source 10 is positioned adjacent thereto as illustrated with respect to extension 21 in figure in FIG. 3.

When design considerations of the mold or casting do not permit transmitting radiation through the sprue or vent openings, transparent channels 55 may be used to conduct radiation 17 from the source 10 into the mold cavity as illustrated by FIG. 6. The transparent channels may be comprised of glass or any other material capable of channeling the reaction initiating radiation into the mold cavity 34.

Figure 7:
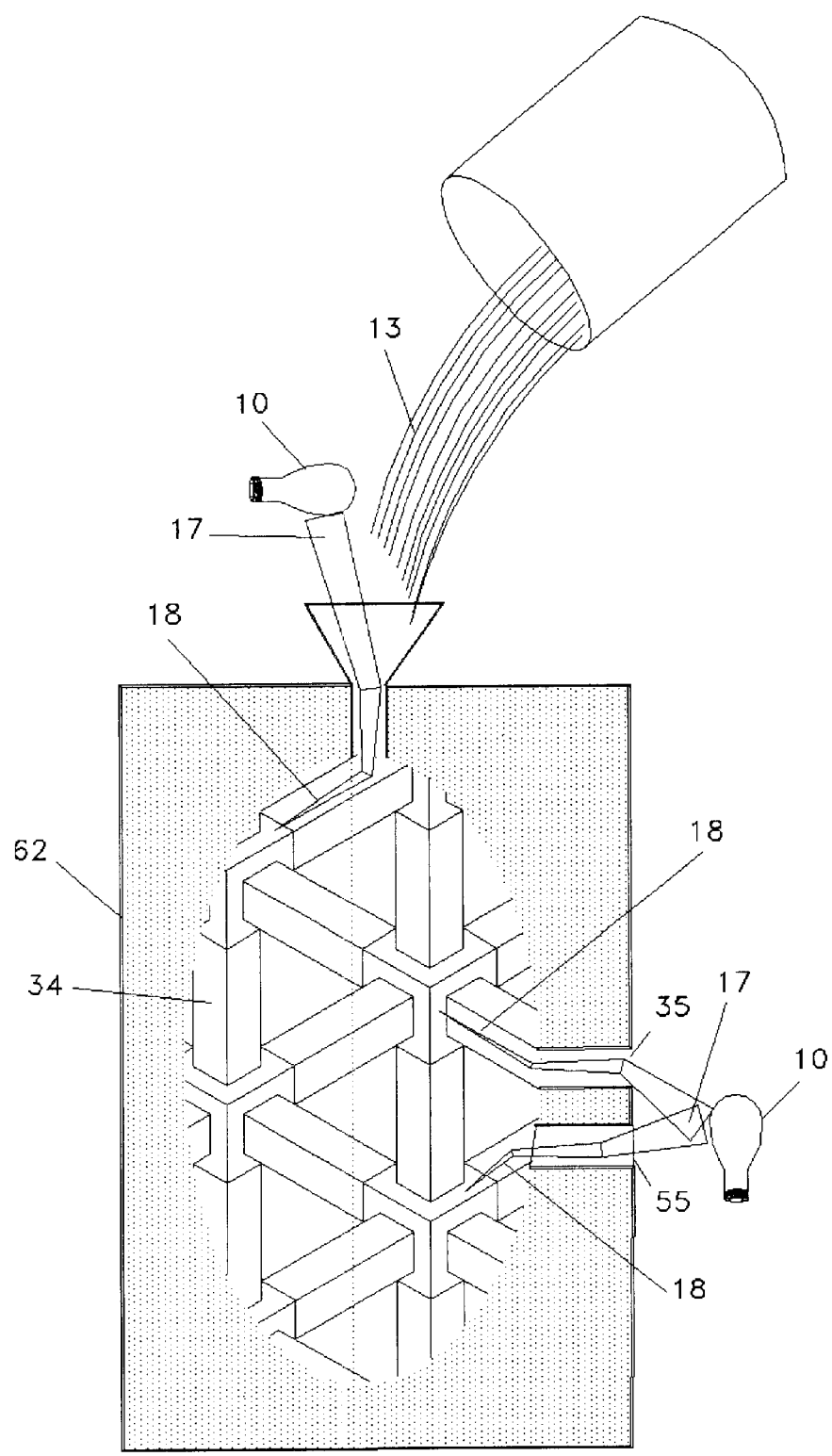
FIG. 7 is a simplified schematic representation of the invention depicting the application of solidifying radiation through vent openings, actinic radiation transparent windows and the mold sprue.

FIG. 7 illustrates the invention incorporating a plurality of different means for applying solidifying radiation to the casting compound. The mold body 62 includes a radiation transparent window 55 and a vent openings 35. The vent openings 35 allows air to escape from the mold cavity as the casting compound 13 is being poured into the sprue. When the mold compound reaches the vent opening, the radiation solidifies the casting compound, creating a window in the vent opening.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A system for producing a three-dimensional object from a fluid medium which solidifies when subjected to radiation, comprising:

a radiation source;

a mold incorporating a cavity dimensioned to create said three-dimensional object;

means for admitting said fluid medium into said cavity;

a passage through a wall of said mold into said cavity for conducting radiation from said radiation source into said cavity; and said passage comprises said means for admitting said fluid medium into said cavity.

2. A system for producing a three-dimensional object from a fluid medium which is solidified when subjected to radiation as defined by claim 1, wherein said passage is a means for venting said cavity.

3. A system for producing a three-dimensional object from a fluid medium which is solidified when subjected to radiation as defined by claim 1, comprising:

a second passage through a wall of said mold into said cavity for conducting radiation from said radiation source into said cavity; and said second passage is sealed by a radiation transmissive means.

4. A system for producing a three-dimensional object from a fluid medium which is solidified when subjected to radiation as defined by claim 1, wherein said radiation source is positioned to irradiate said fluid medium as said fluid medium flows into said cavity.

5. A system for producing a three-dimensional object from a fluid medium which is solidified when subjected to radiation as defined by claim 4, wherein said means for admitting said fluid medium into said cavity includes a conduit with a radiation transparent section.

6. A system for producing a three-dimensional object from a fluid medium which is solidified when subjected to radiation as defined by claim 1, wherein said means for admitting said fluid medium into said cavity includes a fluid medium reception port positioned higher than said cavity and a discharge port entering the bottom of said cavity.

7. A system for producing a three-dimensional object from a fluid medium which is solidified when subjected to radiation as defined by claim 1, comprising:

a pump for injecting said fluid medium into said cavity.

8. A system for producing a three-dimensional object from a fluid medium which is solidified when subjected to radiation as defined by claim 1, wherein said fluid medium is selected from the class of liquid compounds which harden when exposed to radiation and which conduct said radiation.

9. A system for producing a three-dimensional object from a fluid medium which is solidified when subjected to radiation as defined by claim 1, wherein said fluid medium is selected from the class of liquid compounds which harden in a chain reaction initiated by exposure to said radiation.

10. system for producing a three-dimensional object from a fluid medium which is solidified when subjected to radiation as defined by claim 1, wherein said radiation source is a single point source of actinic radiation capable of initiating a liquid to solid phase change in said fluid medium.

11. A method for casting an object in a three-dimensional mold cavity, including the steps of:

flowing a fluid casting medium selected from the class of compounds which solidify when subjected to radiation into said mold cavity via a spue opening; and hardening said fluid casting medium to create said object by transmitting radiation into said fluid casting medium through said sprue opening in the mold.

12. A method for casting an object in a three-dimensional mold cavity, including the steps of:

flowing a fluid casting medium selected from the class of compounds which solidify when subjected to radiation into said mold cavity; and transmitting radiation into said fluid casting medium in said mold cavity by directing said radiation into a vent opening in said mold cavity.

13. A method for casting an object in a three-dimensional mold cavity as defined by claim 11, wherein said step of flowing a fluid casting medium selected from class of compounds which solidify when subjected to radiation into said mold cavity includes pumping said fluid medium into said mold cavity.

14. A method for casting an object in a three-dimensional mold cavity as defined by claim 11, including the further step of conducting said radiation throughout said mold cavity via said casting medium.

15. A method for casting an object in a three-dimensional mold cavity as defined by claim 11, wherein said step of hardening said fluid casting medium by transmitting radiation into said fluid casting medium includes initiating a hardening chain reaction in said fluid casting medium with said radiation.

16. A method for casting an object in a three-dimensional mold cavity, including the steps of:

flowing a fluid casting medium selected from the class of compounds which solidify when subjected to radiation into said mold cavity; and hardening said fluid casting medium to create said object by transmitting radiation into said fluid casting medium before it enters said mold cavity.

17. A method for casting an object in a three-dimensional mold cavity as defined by claim 16, wherein said step of hardening said fluid casting medium includes transmitting radiation into said fluid casting medium as it is entering said mold cavity.

18. A method for casting an object in a three-dimensional mold cavity as defined by claim 16, wherein said step of flowing a fluid casting medium selected from the class of compounds which solidify when subjected to radiation into said mold cavity includes passing said fluid medium through a conduit including a section transparent to said radiation and said step of hardening of said fluid casting medium by transmitting radiation into said fluid casting medium as it is entering said mold cavity includes transmitting said radiation through said transparent section.

19. A method for casting an object in a three-dimensional mold cavity as defined by claim 16, wherein said step of hardening said fluid casting medium by transmitting radiation into said fluid casting medium includes initiating a hardening chain reaction in said fluid casting medium with said radiation.

* * * * *